US007611236B2

(12) United States Patent
Park

(10) Patent No.: US 7,611,236 B2
(45) Date of Patent: Nov. 3, 2009

(54) HEATING APPARATUS FOR A SOLID INK

(75) Inventor: Sang-cheol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 11/374,079

(22) Filed: Mar. 14, 2006

(65) Prior Publication Data

US 2007/0046746 A1 Mar. 1, 2007

(30) Foreign Application Priority Data

Aug. 29, 2005 (KR) ...................... 10-2005-0079571

(51) Int. Cl.
*B41J 2/175* (2006.01)
*B41J 2/17* (2006.01)
*G01D 11/00* (2006.01)

(52) U.S. Cl. ............................ 347/88; 347/99; 347/84; 347/85; 347/95

(58) Field of Classification Search .................. 347/88, 347/99, 84, 85, 95
See application file for complete search history.

(56) References Cited

U.S. PATENT DOCUMENTS

| | | | | |
|---|---|---|---|---|
| 5,424,767 | A * | 6/1995 | Alavizadeh et al. | 347/17 |
| 5,635,964 | A * | 6/1997 | Burr et al. | 347/17 |
| 5,784,089 | A | 7/1998 | Crawford | |
| 6,193,365 | B1 * | 2/2001 | Ikezaki | 347/88 |
| 6,530,655 | B2 * | 3/2003 | Jones et al. | 347/88 |
| 7,011,399 | B2 * | 3/2006 | Godil et al. | 347/88 |
| 7,118,205 | B2 * | 10/2006 | Jones et al. | 347/88 |
| 2002/0180852 | A1 | 12/2002 | Jones et al. | |
| 2005/0128266 | A1 | 6/2005 | Jones | |
| 2005/0146546 | A1 | 7/2005 | Godil et al. | |

FOREIGN PATENT DOCUMENTS

| | | |
|---|---|---|
| JP | 63-5948 | 1/1988 |
| JP | 63-191644 | 8/1988 |
| JP | 11-10862 | 1/1999 |

OTHER PUBLICATIONS

Korean Office Action dated Sep. 28, 2006 issued in KR 2005-79571.
Chinese Office Action dated Apr. 4, 2008 issued in CN 2006-10121886.0.

* cited by examiner

*Primary Examiner*—Stephen D Meier
*Assistant Examiner*—Leonard S Liang
(74) *Attorney, Agent, or Firm*—Stanzione & Kim LLP

(57) ABSTRACT

A heating apparatus for a solid ink includes a heating unit to melt ink sticks of different colors, the heating unit being mounted to one side of an ink stick loader and provided with a plurality of heating parts in one body. The heating unit has a heating plate with the plurality of the heating parts in one body, a plurality of heating lines formed on each of the heating parts of the heating plate in a serpentine shape with first ends commonly connected to each other, a common wire connected to a common connected portion of the heating lines, and a plurality of wires connected to second ends of the heating lines, respectively. The common wire is located at a center portion of the heating plate, and the heating lines are symmetrically-located left and right with respect to the common wire. The common wire is disposed at the center portion of the heating plate.

20 Claims, 6 Drawing Sheets

HEATING APPARATUS FOR A SOLID INK

CROSS-REFERENCE TO RELATED APPLICATIONS

This application claims priority under 35 U.S.C. § 119 from Korean Patent Application No. 2005-79571 filed on Aug. 29, 2005 in the Korean Intellectual Property Office, the entire content of which is incorporated herein by reference.

BACKGROUND OF THE INVENTION

1. Field of the Invention

The present general inventive concept relates to a solid ink jet printer, and more particularly, to a heating apparatus for the solid ink of a solid ink jet printer, which is provided with a heating plate having an improved structure for heating the solid ink.

2. Description of the Related Art

When Tektronix, Inc. introduced a Tektronix Phaser® III color printer in 1991, a solid ink printing technology could be successfully commercialized. This technology employs a special ink jet printhead that is rapidly shuttled back and forth to spray ink directly onto a page as in most of recent ink jet printers. The ink used therein is solid at room temperature, and is melted and kept at about 140° C. in the printhead. The solid ink, e.g., a color stick, is durable and is usable for rapid printing operations, generating vivid color on almost all kinds of paper including expensive office bond paper and recycled paper.

Unlike other related printers, in which operation of the printer must stop when printing raw materials (e.g., ink) run out in order to replace the printing raw materials, it is possible to input the solid color stick in the Tektronix printer during the operation of the printer. Further, mass production of the solid color stick is easy since a separate cartridge for containing the ink is not necessary. In addition, a solid crayon material, i.e., an ink raw material, is very inexpensive. Therefore, when compared with a laser printer, a purchase cost of the solid ink jet printer is 12~20% less than a purchase cost of the laser printer, and a maintenance cost of the solid ink jet printer is one half of a maintenance cost of the laser printer.

FIG. 1 is a view illustrating a configuration of a solid ink feed part of a conventional solid ink printer disclosed in U.S. Pat. No. 5,784,089, and FIG. 2 is a perspective view illustrating a configuration of an ink stick storage part of the solid ink printer.

Referring to FIGS. 1 and 2, an ink stick feed apparatus includes an ink stick loading bin assembly 16, a yoke 17, a top cover 20 and an ink stick feed cover 30.

The ink stick loading bin assembly 16 for storing ink sticks 12, for example, according to their colors, and for moving the ink sticks 12 toward heating plates 29*a* to 29*d*, has feed chutes 25*a* to 25*d* and a key plate 18 covering the feed chutes 25*a* to 25*d*. In the key plate 18, openings 24*a* to 24*d*, through which the ink sticks 12 are inserted, are formed.

The top cover 20 is pivotally mounted to open and close an upper portion of the key plate 18. The ink stick feed cover 30 is pivotally mounted to sidewalls 21 through a pair of pivot arms 22. The yoke 17 is mounted on top of the key plate 18 and is slidable along the top of the key plate 18 to assist in moving the individual ink sticks 12 forward in the feed chutes 25*a* to 25*d* toward the heating plates 29*a* to 29*d*.

The ink sticks 12 are inserted through the openings 24*a* to 24*d* of the key plate 18 corresponding to the feed chutes 25*a* to 25*d* to be melted by the heating plates 29*a* to 29*d* and to flow into individual ink reservoirs (not illustrated) of a printhead 70 (see FIG. 3).

The heating plates 29*a* to 29*d* are attached to one end portion of the ink stick loading bin assembly 16 by a melt plate adapter assembly 27.

FIG. 3 is a view illustrating the ink stick feed part 16 and the printhead 70 in accordance with the prior art, and FIG. 4 is a front view illustrating a configuration of the heating plates 29*a*-29*d* in accordance with the prior art.

Referring to FIG. 3, the ink stick loading bin assembly 16 is disposed above the printhead 70. On one end portion of the ink stick loading bin assembly 16, the heating plates 29*a* to 29*d* for the individual colors, i.e., cyan, magenta, yellow and black, are fixed by wire springs 73*a* to 73*d*.

Referring to FIG. 4, on the heating plates 29*a* to 29*d*, heating lines 75*a* to 75*d* electrically generating heat are formed. And to the heating lines 75*a* to 75*d*, input and output wires 77*a* and 77*b* supplying power thereto are connected. Further, on one side of the heating plates 29*a* to 29*d*, temperature detecting sensors 81*a* to 81*d* to detect temperatures of the heating plates 29*a* to 29*d* are provided. And to each of the temperature detecting sensors 81*a* to 81*d*, a pair of wires 83*a* and 83*b* are also connected.

However, there is a drawback in the prior art described above; since the heating plates 29*a* to 29*d* are formed as a plurality of separate heating plates, and since the heating plates 29*a* to 29*d* are each fixed by the individual wire springs 73*a* to 73*d*, assembly is difficult and a cost is increased.

Further, there is another drawback; since the input and output wires 77*a*, 77*b* supplying power to the individual heating lines 75*a* to 75*d* are provided separately, the number thereof is as much as eight and thus the cost is further increased.

SUMMARY OF THE INVENTION

The present general inventive concept provides a heating apparatus for a solid ink, which is capable of improving assembly characteristics of a heating plate.

The present general inventive concept also provides an image forming system having a heating apparatus for a solid ink, which is capable of simplifying an arrangement of connection wires connected to a heating plate.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a heating apparatus for a solid ink, the apparatus including an ink stick loader provided with a plurality of supply channels to accommodate ink sticks of different colors, respectively, and a heating unit mounted to one side of the ink stick loader and provided with a plurality of heating parts to melt the ink sticks of different colors, the plurality of heating parts being located in one body.

The heating unit may include a heating plate including the plurality of the heating parts in one body, a plurality of heating lines formed on each of the plurality of heating parts of the heating plate in a serpentine shape, first ends of each of the plurality of heating lines being commonly connected to each other, a common wire connected to a commonly connected portion of the heating lines, and a plurality of wires connected to second ends of each of the plurality of heating lines.

The ink sticks of different colors may be cyan, yellow, magenta, and black ink sticks, and the plurality of heating parts may be in contact with the ink sticks of different colors.

The common wire may be located at a center portion of the heating plate. The heating lines may be symmetrically-located on left and right sides of the common wire.

The heating apparatus may further include a detecting sensor to detect a temperature of the plurality of heating parts.

The heating plate may be attached to the ink stick loader by a wire spring.

The foregoing and/or other aspects and utilities of the present general inventive concept may be achieved by providing a solid ink heating unit of an image forming apparatus, the solid ink heating unit including a heating plate including a plurality of heating parts located in a single body, a plurality of wires connected to corresponding ones of the plurality of heating parts, and a common wire connecting each of the plurality of heating parts to one another. The heating plate may further include a first portion and a second portion, the second portion having a groove formed between the adjacent heating parts to form sections to accommodate corresponding portions of the heating parts. The plurality of heating parts may include a plurality of heating lines, which include a first line connected to the common wire and second lines connected to the first line, and the first wire line is disposed on the first portion of the heating plate. The second wire lines may be dispose in corresponding ones of the sections of the second portion of the heating plate. The solid ink heating unit may further include a single terminal formed on the first line of the plurality of wires, and the common wire may be connected to the single terminal. The solid ink heating unit may further include a plurality of terminals formed on corresponding ends of the second lines, and the plurality of wires may be connected to corresponding ones of the plurality of terminals. End portions of the second lines connected to corresponding ones of the plurality of terminals may be inclined away from the first line toward the corresponding ones of the plurality of terminals. The plurality of terminals may be spaced-apart from the first line by a first distance and closest portions of the second wires to the first line are parallel to the first line and spaced-apart from the first line by a second distance. The solid ink heating unit may further include a plurality of sensors disposed in corresponding ones of the plurality of heating parts, and a portion of the common wire connected to each of the plurality of parts may be disposed between the plurality of sensors and the plurality of heating parts.

The foregoing and/or other aspects and utilities of the present general inventive concept may also be achieved by providing a solid ink heating apparatus of an image forming apparatus, including a single heating plate having a first portion and a second portion having a plurality of sections, and a plurality of heating parts having a first line disposed in the first portion of the single heating plate and second lines extended from the first line and disposed in corresponding ones of the plurality of sections of the second portion of the single heating plate. The solid ink heating apparatus may further include a common wire connected to the first terminal; a plurality of terminals formed on ends of the second lines, and a plurality of wires connected to corresponding ones of the plurality of terminals. A potential may be supplied between the common wire and each of the plurality of wires. The common terminal may be formed on one of an end of the first line and a middle of the first line. The solid ink heating apparatus may further include a plurality of sensors to detect a temperature, and the single heating plate may have a third portion one which the plurality of sensors are disposed, and the second portion may be disposed between the first portion and the third portion. The solid ink heating apparatus may further include one or more grooves to separate the adjacent sections of the second portions of the single heating plate.

The foregoing and/or other aspects and utilities of the present general inventive concept may also be achieved by providing an image forming apparatus including the heating unit to heat solid ink to form liquid ink, the heating unit including a heating plate including a plurality of heating parts located in a single body, a plurality of wires, each wire of the plurality of wires being connected to a corresponding heating part of the plurality of heating parts, and a common wire connecting each of the plurality of heating parts to one another, an ink loader to feed solid ink to the heating unit, and a printhead comprising a nozzle and an ink reservoir to receive the liquid ink from the ink loader through the heating unit, the ink reservoir having a predetermined temperature to maintain the liquid ink in a liquid state. The ink loader may include a plurality of ink supply channels, the printhead may include a plurality of ink reservoirs corresponding to the plurality of ink supply channels, and in which the plurality of heating parts of the heating unit correspond to the plurality of ink reservoirs. The heating plate of the heating unit may further include a single wire spring to fix the heating plate to one side of the ink loader.

The foregoing and/or other aspects and utilities of the present general inventive concept may also be achieved by providing an ink jet printing method including loading solid ink onto an ink loader, feeding the solid ink from the ink loader through a heater, heating the solid ink to form liquid ink using the heating unit, passing the liquid ink to an ink reservoir of a printhead, the ink reservoir having a predetermined temperature to maintain the ink in a liquid state, supply the liquid ink from the ink reservoir to a nozzle of the printhead, and ejecting the liquid ink from the nozzle to a rotating photoconductive drum to form a latent image on the rotating photoconductive drum.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
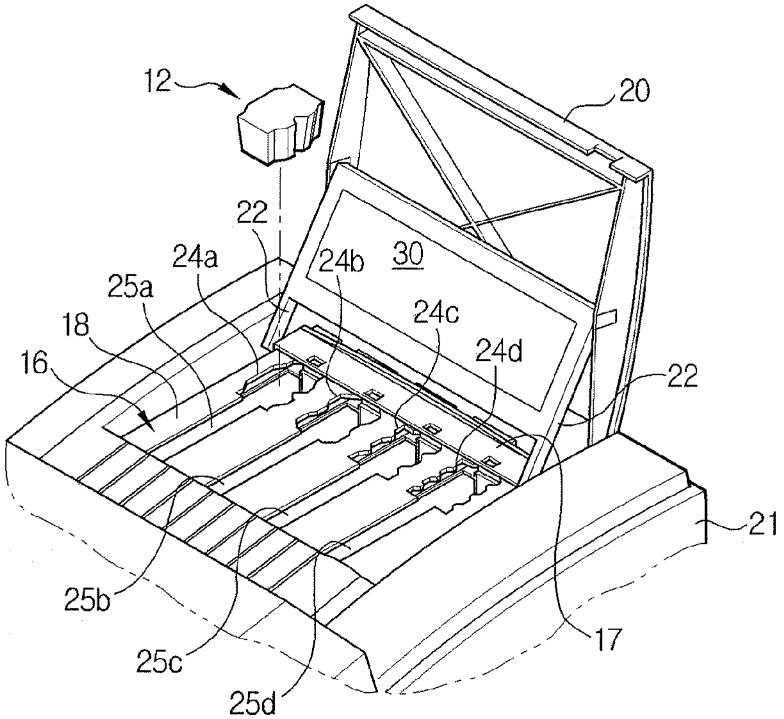
FIG. 1 (PRIOR ART)
FIG. 1 is a view illustrating a configuration of a solid ink feed part of a conventional solid ink printer.
Figure 2:
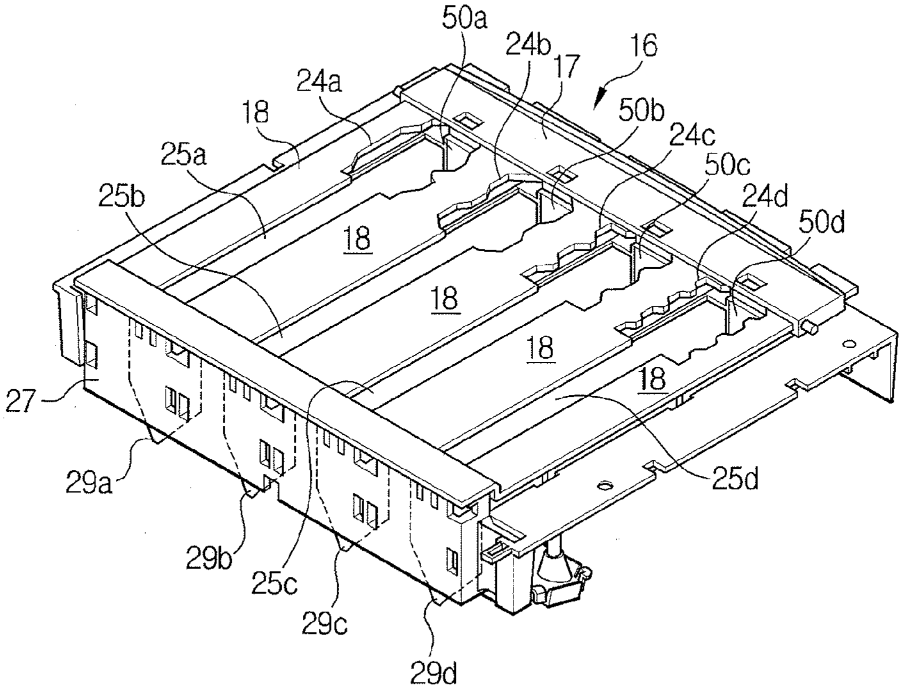
FIG. 2 (PRIOR ART)
FIG. 2 is a perspective view illustrating a configuration of an ink stick storage part of the solid ink printer in FIG. 1.
Figure 3:
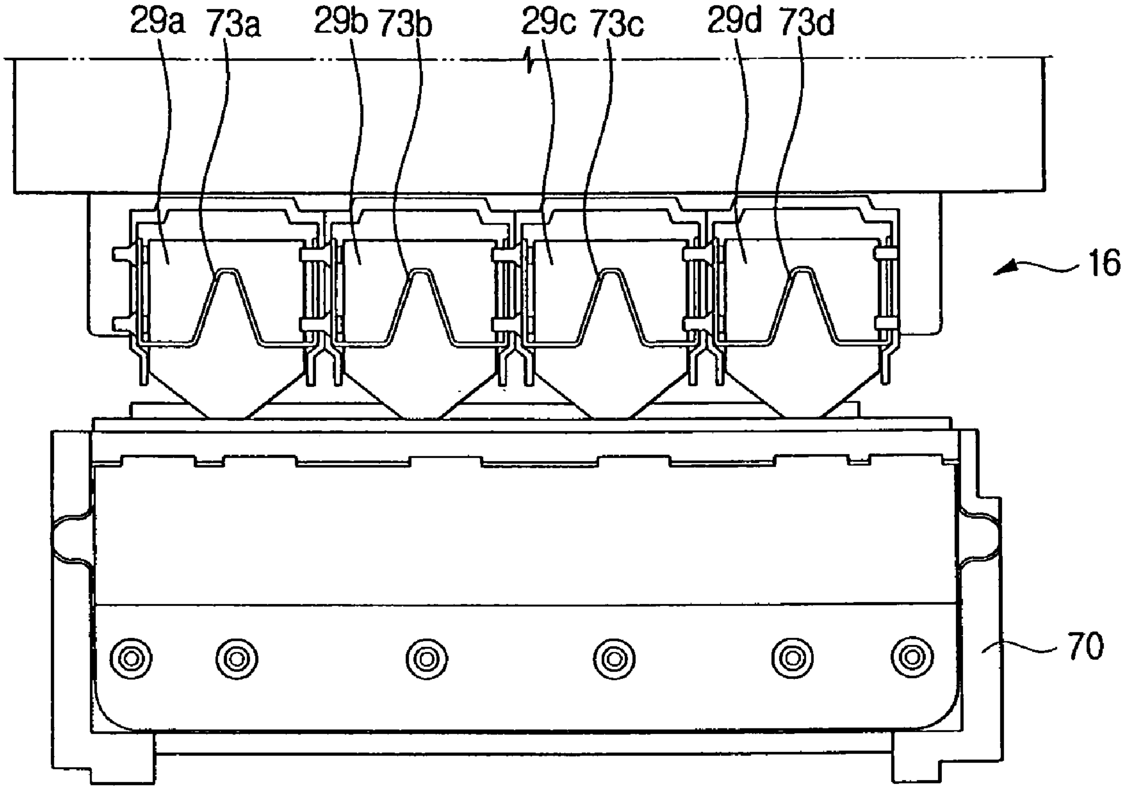
FIG. 3 (PRIOR ART)
FIG. 3 is a view illustrating the ink stick feed part and a printhead of the solid ink printer in FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 5:
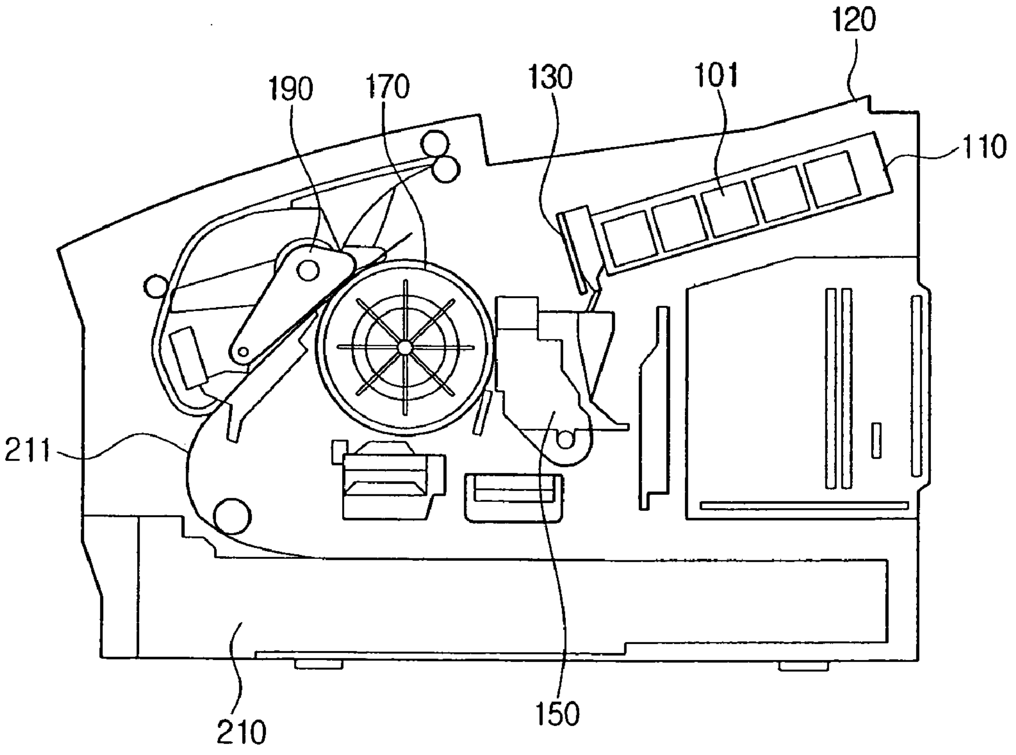
FIG. 5 is a schematic view illustrating a configuration of a solid ink jet printer having a heating apparatus for a solid ink in accordance with the present general inventive concept.

FIG. 5 is a schematic view illustrating a configuration of a solid ink jet printer having a heating apparatus for a solid ink in accordance with the present general inventive concept.

Referring to FIG. 5, solid ink sticks 101 are fed in an ink stick loader 110, to be melted and turned into a liquid by a heating unit 130.

The melted ink is directed into an ink reservoir 151 of a printhead 150 (see ink reservoirs 151*a* to 151*d* in FIG. 7), which is kept at a predetermined temperature to maintain the ink in a liquid state.

The ink stored in the ink reservoir 151 in a liquid state is supplied to nozzles (not illustrated) of the printhead 150, and then jetted onto a rotating drum 170 to form an image thereon.

The image formed on the drum 170 can be transferred onto a writing medium 211 supplied from a writing medium supply cassette 210 by a transfer unit 190, and then the writing medium 211 having the image formed thereon can be discharged outside a main body 120. Alternatively, the image formed on the drum 170 can be transferred to an intermediate transfer medium before or instead of being transferred to the writing medium 211.

Figure 6:
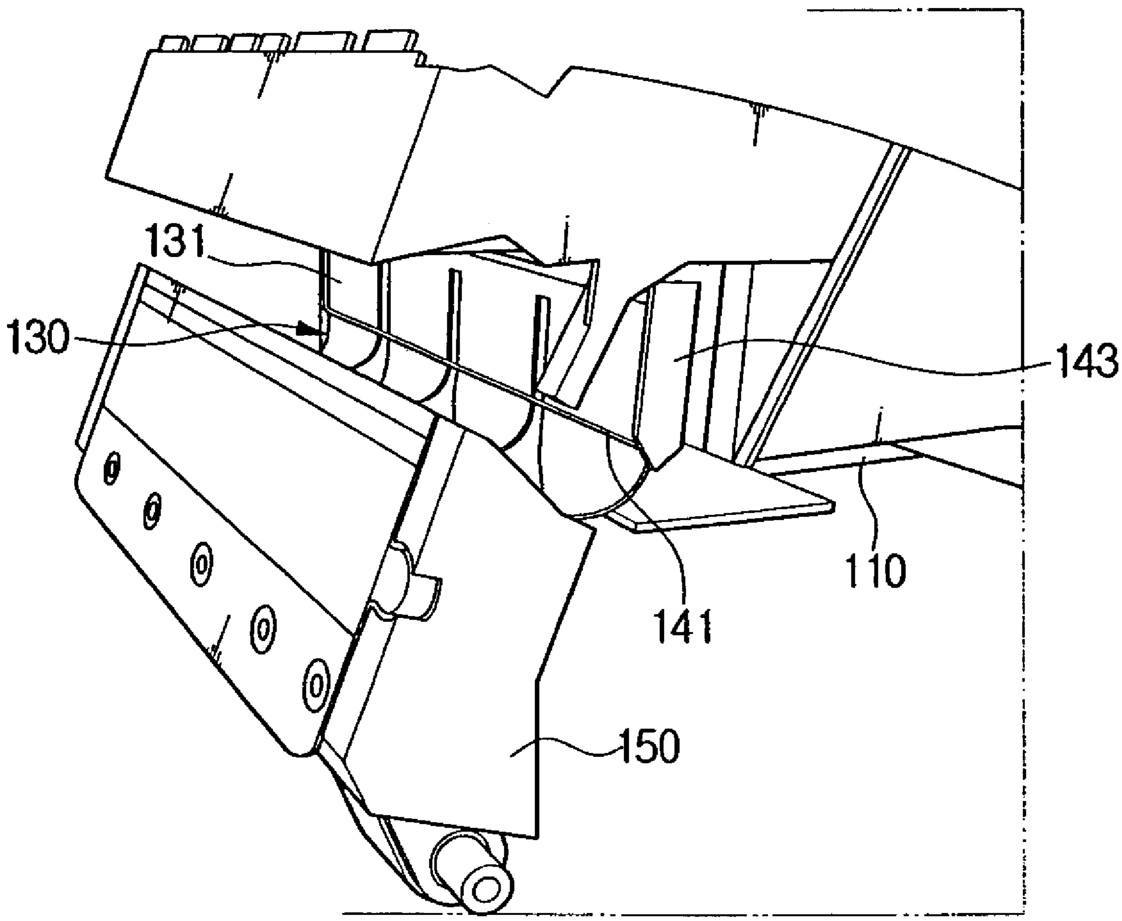
FIG. 6 is a perspective view of a printhead and an ink stick loader of the solid ink jet printer in FIG. 5 when they are combined with each other.
Figure 7:
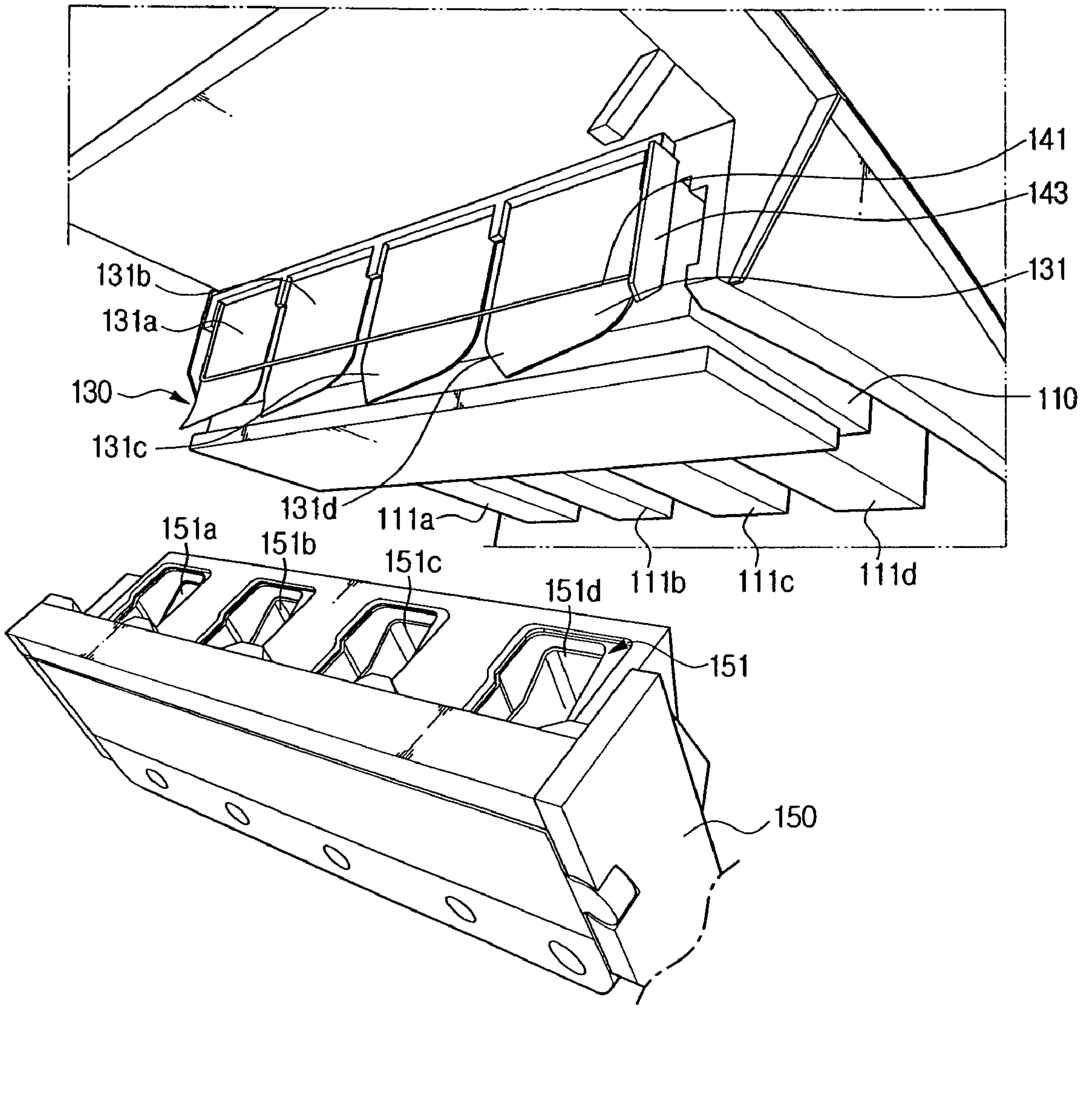
FIG. 7 is a perspective view of the printhead and the ink stick loader of the solid ink jet printer in FIG. 5 when they are separated from each other.

FIG. 6 is a perspective view of the printhead 150 and the ink stick loader 110 in FIG. 5 when they are combined with each other, and FIG. 7 is a perspective view of the printhead 150 and the ink stick loader 110 of the solid ink jet printer in FIG. 5 when they are separated from each other.

Referring to FIGS. 6 and 7, the ink stick loader 110 is provided with a plurality of supply channels 111*a* to 111*d*, the heating unit 130 is provided with a plurality of heating parts 131*a* to 131*d* located in one body, the body being installed at one side of the ink stick loader 110 to melt the individual ink sticks 101 of different colors, and the printhead 150 is provided with the plurality of ink reservoirs 151*a* to 151*d* to store the melted ink passed through the heating unit 130.

Figure 8:
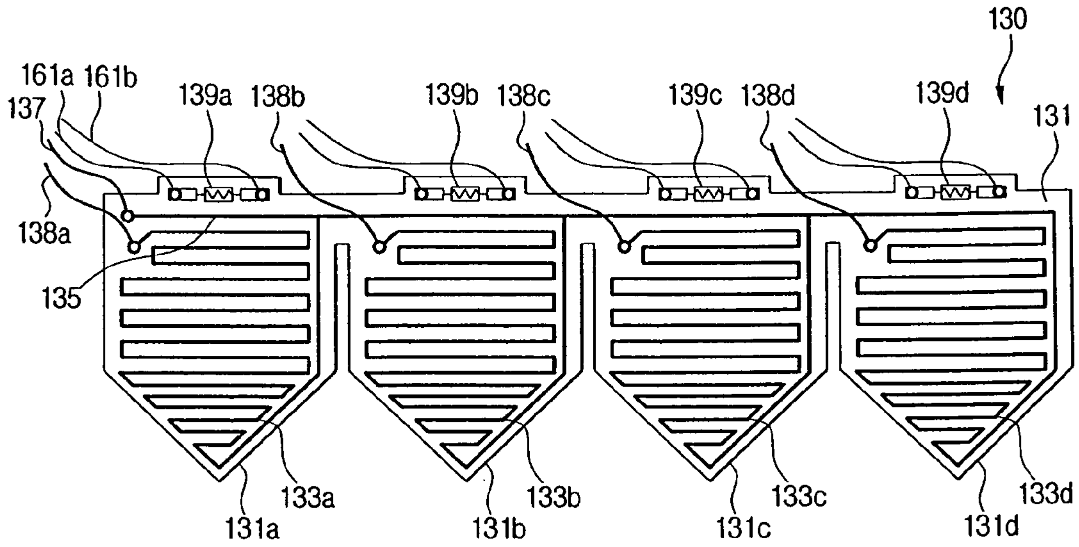
FIG. 8 is a front view illustrating a configuration of a solid ink heating unit in accordance with an embodiment of the present general inventive concept.

FIG. 8 is a front view illustrating a configuration of a solid ink heating unit in accordance with an embodiment of the present general inventive concept.

Figure 4:
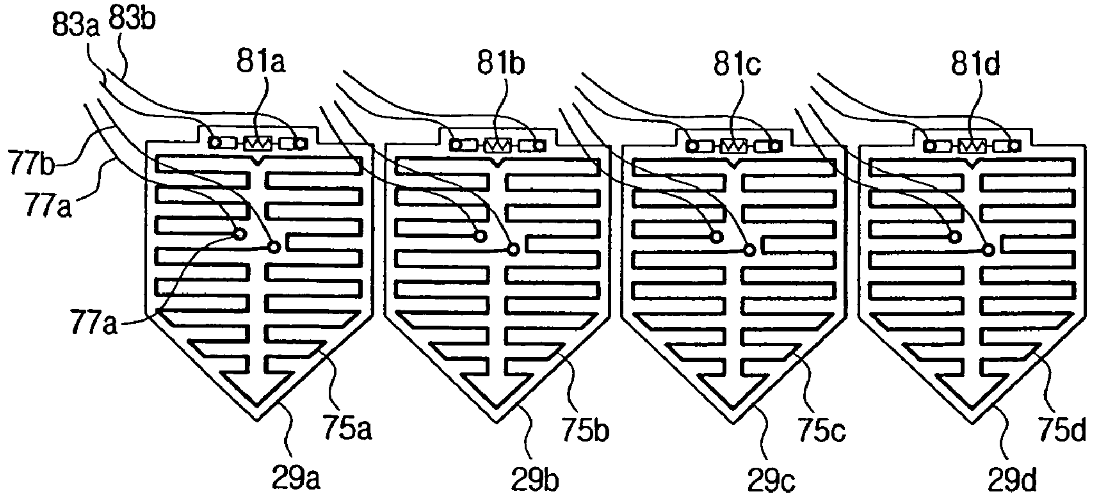
FIG. 4 (PRIOR ART)
FIG. 4 is a front view illustrating a configuration of the heating plates the solid ink printer in FIG. 1.

Referring to FIGS. 5-8, the heating unit 130 has a heating plate 131 having the plurality of heating parts 131*a* to 131*d* located in one body, a plurality of heating lines 133*a* to 133*d* formed on the individual heating parts 131*a* to 131*d* of the heating plate 131 in a serpentine shape, each having one end commonly connected to each other, a common wire 137 connected to a commonly connected portion 135 of the heating lines 133*a* to 133*d*, and a plurality of wires 138*a* to 138*d* connected to other ends of each of the heating lines 133*a* to 133*d*, respectively. In comparison with the conventional configuration illustrated in FIG. 4, the total number of the wires used in the heating unit 130 is reduced from eight to five. Therefore, the heating unit 130's assembly process can become simpler and its production cost can be reduced.

Terminals between the plurality of wires 138*a* to 138*d* and corresponding ones of the heating wires 133*a*' to 133*d*' are formed on the heating plate 131. A second terminal between the common wire 137 and ends of the heating wires 133*a*' to 133*d*' is formed on the heating plate 131. The second terminal is disposed on a common end of the heating wires 133*a*' to 133*d*'. The common end of the heating wires 133*a*' to 133*d*' is disposed between terminals of the connection wires 161*a* to 161*d* and the heating wires 133*a*' to 133*d*'.

The heating plate 131 is formed of a metal material with a high conductivity on which the heating lines 133*a* to 133*d* are attached. Therefore, when power is supplied to the heating lines 133*a* to 133*d*, heat generated from the heating lines 133*a* to 133*d* heats the metal material to melt the ink sticks 101 and turn it to a liquid, wherein the heating plate 131 is mounted at one side of the ink stick loader 110 to be in direct contact with the inks sticks 101. Further, a lower end portion of each of the heating parts 131*a* to 131*d* is pointed in shape and bent toward the ink reservoirs 151*a* to 151*d*, so that the melted ink in a liquid state flows along an inner surface of the heating plate 131 down to the ink reservoirs 151*a* to 151*d* (see FIG. 7).

In addition to the configuration described above, temperature detecting sensors 139*a* to 139*d* to detect a temperature of the heating plate 131 may be provided at one portion of the heating parts 131*a* to 131*d*, in which a pair of connection wires 161*a* and 161*b* is connected to each of the temperature detecting sensors 139*a* to 139*d*.

Referring again to FIG. 7, the heating plate 131 is fixed at the one side of the ink stick loader 110 by a wire spring 141. The wire spring 141 is supported at its both end portions by brackets 143 in contact with the one side of the ink stick loader 110. The wire spring 141 elastically presses one surface of the heating plate 131, wherein the wire spring 141 and the heating plate 131 being formed into a single part so that an assembly time and cost can be reduced when compared with the conventional solid ink printer with four wire springs.

Figure 9:
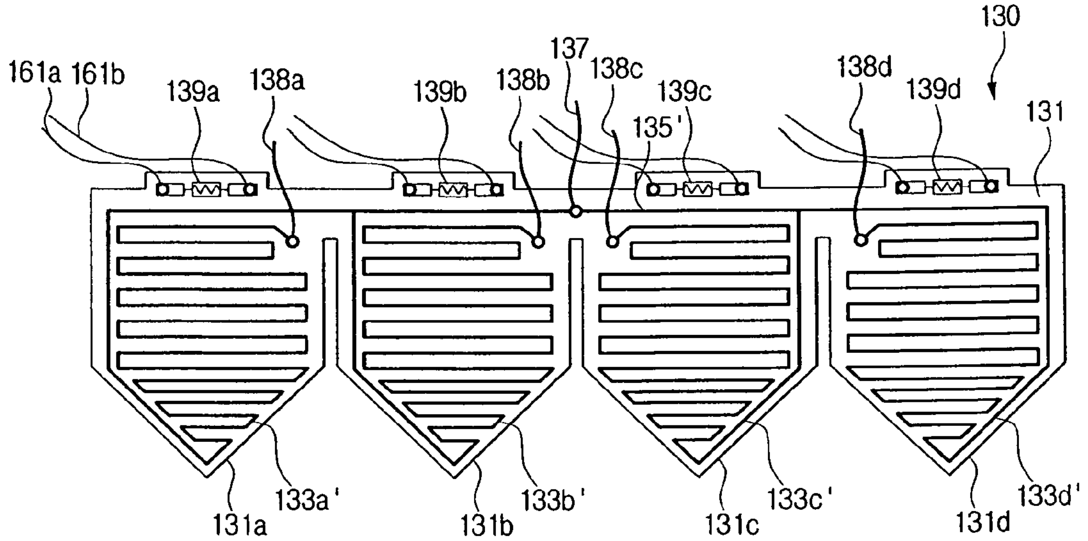
FIG. 9 is a front view illustrating a configuration of a solid ink heating unit in accordance with an embodiment of the present general inventive concept.

FIG. 9 is a front view illustrating a configuration of a solid ink heating unit of a heating apparatus for a solid ink an image forming apparatus according to an embodiment of the present general inventive concept.

Referring to FIGS. 5-9, the common wire 137 is connected to a common heating line 135' at a center portion of the heating plate 131, and heating lines 133*a*' to 133*d*' patterned on the individual heating parts 131*a* to 131*d* are symmetric with respect to the common wire 137. With such the configuration, a more efficient arrangement as compared to conventional printers can be achieved.

In accordance with the present general inventive concept, the solid ink heating unit with the configuration described above is advantageous in that, since the heating plate is provided with the heating parts for the respective colors in one body, assembly characteristics are improved and a cost of the printer is reduced.

Further, the heating lines formed on the individual heating parts are commonly connected to each other and the common wire is used. Therefore, the number of the wires is reduced, thus advantageously reducing the cost of the printer.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A heating apparatus for a solid ink, the heating apparatus comprising:

an ink stick loader having a plurality of supply channels to accommodate ink sticks of different colors, respectively; and a heating unit mounted to one side of the ink stick loader and having a heating plate which has a plurality of heating parts to melt the ink sticks of different colors, the plurality of heating parts being located in a single body, wherein the heating unit comprises:

a plurality of heating lines formed on each of the plurality of heating parts of the heating plate in a serpentine shape, first end of each of the plurality of heating lines being commonly connected to each other;

a common wire connected to a commonly connected portion of the heating lines; and a plurality of wires connected to second end of each of the plurality of heating lines.

2. The heating apparatus according to claim 1, wherein the ink sticks of different colors are cyan, yellow, magenta, and black ink sticks, and the plurality of heating parts are in contact with corresponding ones of the ink sticks of different colors.

3. The heating apparatus according to claim 2, wherein the common wire is located at a center portion of the heating plate.

4. The heating apparatus according to claim 3, wherein the heating lines are symmetrically-located on left and right sides of the common wire.

5. The heating apparatus according to claim 1, further comprising:

a detecting sensor to detect a temperature of the plurality of heating parts.

6. The heating apparatus according to claim 1, wherein the heating plate is attached to the ink stick loader by a wire spring.

7. The heating apparatus according to claim 1, wherein the plurality of heating parts are located in a single continuous body.

8. A solid ink heating unit of an image forming apparatus, the solid ink heating unit comprising:

a heating plate comprising a plurality of heating parts located in a single body;

a plurality of external wires to connect to corresponding ones of the plurality of heating parts; and an external common wire to electrically connect to each of the plurality of heating parts, wherein the plurality of heating parts comprises a plurality of heating lines, which comprises:

a first line connected to the external common wire, the first line being disposed on the first portion of the heating plate, wherein the solid ink heating unit further comprises a single terminal formed on the first line of the plurality of external wires, and wherein the external common wires is connected to the single terminal.

9. The solid ink heating unit of claim 8, wherein the heating plate further comprises a first portion and a second portion, the second portion having a groove formed between the adjacent heating parts to form sections to accommodate corresponding portions of the heating parts.

10. The solid ink heating unit of claim 9, wherein the plurality of heating lines further comprises:

second lines connected to the first line.

11. The solid ink heating unit of claim 10, wherein the second lines are disposed in corresponding ones of the sections of the second portion of the heating plate.

12. The solid ink heating unit of claim 10, further comprising:

a plurality of terminals formed on corresponding ends of the second lines, wherein the plurality of external wires are connected to corresponding ones of the plurality of terminals.

13. The solid ink heating unit of claim 12, wherein end portions of the second lines connected to corresponding ones of the plurality of terminals are inclined away from the first line toward the corresponding ones of the plurality of terminals.

14. The solid ink heating unit of claim 12, wherein the plurality of terminals are spaced-apart from the first line by a first distance and closest portions of the second lines to the first line are parallel to the first line and spaced-apart from the first line by a second distance.

15. A solid ink heating unit of an image forming apparatus, the solid ink heating unit comprising:

a heating plate comprising a plurality of heating parts located in a single body;

a plurality of external wires to connect to corresponding ones of the plurality of heating parts;

an external common wire to electrically connect to each of the plurality of heating parts; and a plurality of sensors disposed in corresponding ones of the plurality of heating parts, wherein a portion of the external common wire to electrically connect to each of the plurality of parts is disposed between the plurality of sensors and a plurality of heating lines of the heating parts.

16. A solid ink heating apparatus of an image forming apparatus, comprising:

a single heating plate having a plurality of sections each having a first portion and a second portion;

a plurality of heating parts having a first line disposed in the first portion of the single heating plate and second lines extended from the first line and disposed in the second portion of corresponding ones of the plurality of sections of the single heating plate;

an external common wire connected to a first terminal which is formed at an end of the first line;

a plurality of terminals formed at corresponding ends of the second lines; and a plurality of external wires connected to corresponding ones of the plurality of terminals.

17. The solid ink heating apparatus of claim 16, wherein a voltage potential is supplied between the external common wire and each of the plurality of external wires.

18. The solid ink heating apparatus of claim 16, wherein the first terminal is formed at one of an end of the first line and a middle of the first line.

19. The solid ink heating apparatus of claim 16, further comprising:

one or more grooves to separate adjacent sections of the second portions of the single heating plate.

20. A solid ink heating apparatus of an image forming apparatus, comprising:

a single heating plate having a plurality of sections each having a first portion and a second portion;

a plurality of heating parts having a first line disposed in the first portion of the single heating plate and second lines extended from the first line and disposed in the second portion of corresponding ones of the plurality of sections of the single heating plate; and a plurality of sensors to detect a temperature, wherein the single heating plate includes a third portion on which the plurality of sensors are disposed, and the first portion is disposed between the second portion and the third portion.

* * * * *

UNITED STATES PATENT AND TRADEMARK OFFICE

CERTIFICATE OF CORRECTION

PATENT NO. : 7,611,236 B2
APPLICATION NO. : 11/374079
DATED : November 3, 2009
INVENTOR(S) : Sang-cheol Park It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 279 days.

Signed and Sealed this

Twelfth Day of October, 2010

David J. Kappos

*Director of the United States Patent and Trademark Office*